(12) United States Patent
Happel

(10) Patent No.: US 7,677,603 B2
(45) Date of Patent: Mar. 16, 2010

(54) SEAL ASSEMBLY FOR PIPE-TO-STRUCTURE CONNECTIONS

(75) Inventor: Andrew J. Happel, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 412 days.

(21) Appl. No.: 11/341,795

(22) Filed: Jan. 27, 2006

(65) Prior Publication Data

US 2006/0208429 A1 Sep. 21, 2006

Related U.S. Application Data

(60) Provisional application No. 60/648,521, filed on Jan. 31, 2005.

(51) Int. Cl.
*F16L 27/00* (2006.01)

(52) U.S. Cl. .................. 285/139.2; 285/220; 285/901; 277/607

(58) Field of Classification Search ............... 277/607, 277/616, 630, 637; 285/139.2, 208, 212, 285/211, 220, 293.1, 901, 223, 150.1, 151.1, 285/285.1, 295.1

See application file for complete search history.

(56) References Cited

U.S. PATENT DOCUMENTS

| | | | | |
|---|---|---|---|---|
| 2,968,840 | A | * | 1/1961 | Morse .................... 264/265 |
| 4,109,126 | A | * | 8/1978 | Halbeck .................. 200/302.3 |
| 4,110,585 | A | * | 8/1978 | Brown .................... 200/305 |
| 4,663,036 | A | | 5/1987 | Strobl, Jr. et al. |
| 4,702,501 | A | * | 10/1987 | McLennan ............... 285/197 |
| 4,784,412 | A | * | 11/1988 | Van Dongen ............. 285/387 |
| 5,029,879 | A | | 7/1991 | Strang, Sr. et al. |
| 5,071,143 | A | | 12/1991 | Byerly et al. |
| 5,087,795 | A | * | 2/1992 | Guginsky ................. 285/151.1 |
| 5,129,684 | A | | 7/1992 | Lawrence et al. |
| 5,501,472 | A | | 3/1996 | Brancher et al. |
| 5,538,035 | A | | 7/1996 | Gavin |
| 5,600,094 | A | | 2/1997 | McCabe |
| 5,655,564 | A | | 8/1997 | Gavin |

(Continued)

OTHER PUBLICATIONS

Product Information, "POLYLOK", 3 pages, Jan. 2005.

*Primary Examiner*—Aaron M Dunwoody
(74) *Attorney, Agent, or Firm*—Baker & Daniels LLP

(57) ABSTRACT

A seal assembly for effecting a fluid tight seal between a pipe and an opening in the wall of a structure, particularly a relatively thin-walled structure made of a rigid plastic, fiberglass, or of metal, for example. The seal assembly generally includes a seal ring and an annular nut. The seal ring includes a relatively rigid fastener component having external threads, and a relatively resilient sealing component joined to the fastener component and including a first sealing projection for providing a compressive seal between the seal ring and one side of the structure wall, and a second annular sealing projection for providing a compressive seal between the seal ring and the outer surface of a pipe inserted through the seal ring. The seal ring is inserted through the opening in the structure, and the annular nut is threaded onto the external threads of the fastener component and into engagement with a first side of the wall to thereby compress the first sealing projection against the opposite, second side of the wall. Thereafter, a pipe is inserted through the seal ring to compress the second sealing projection between the outer surface of the pipe and the seal ring.

18 Claims, 5 Drawing Sheets

U.S. PATENT DOCUMENTS 6,099,726 A * 8/2000 Gembolis et al. ........... 210/243
6,254,107 B1 * 7/2001 Neuhaus ..................... 277/650
6,457,725 B1 10/2002 Jones
6,817,631 B1 11/2004 Gavin

* cited by examiner

FIG_1

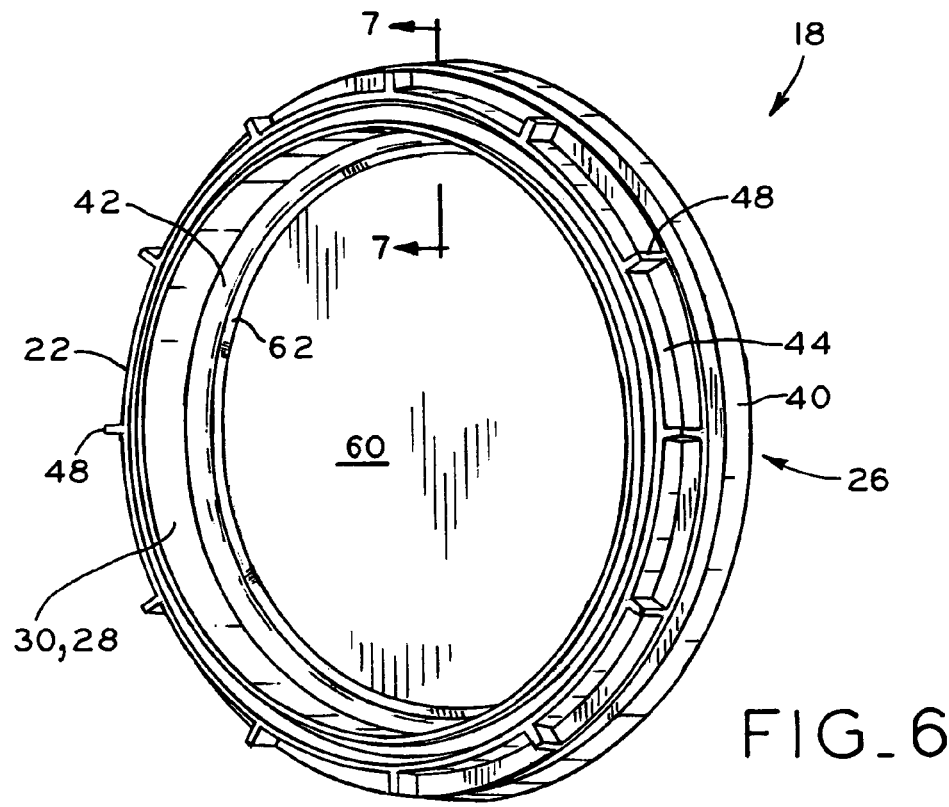
FIG_6
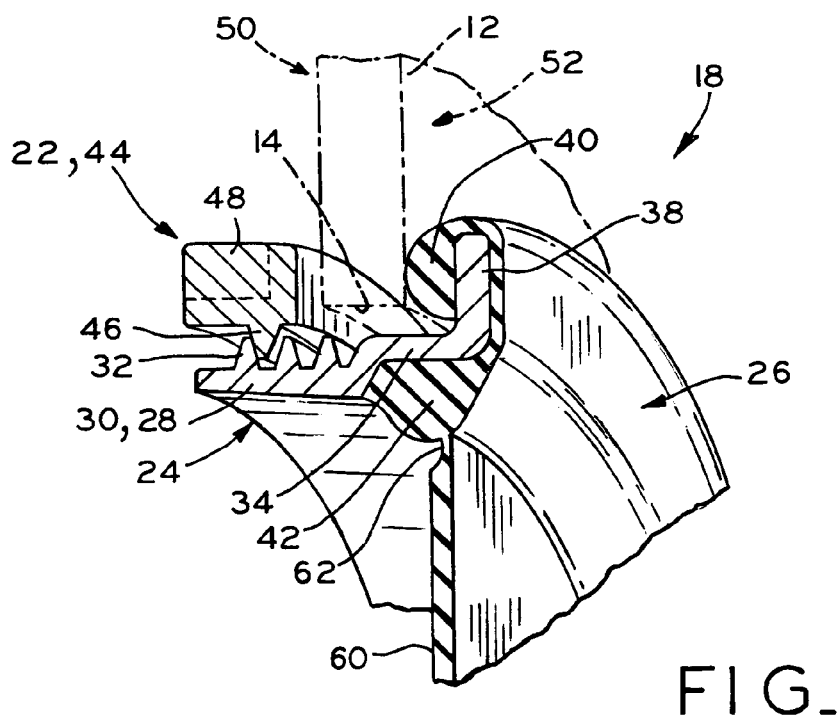
FIG_7

SEAL ASSEMBLY FOR PIPE-TO-STRUCTURE CONNECTIONS

CROSS REFERENCE TO RELATED APPLICATIONS

This application claims the benefit under Title 35, U.S.C. §119(e) of U.S. Provisional Patent Application Ser. No. 60/648,521, entitled GASKET ASSEMBLY FOR PIPE-TO-STRUCTURE CONNECTIONS, filed on Jan. 31, 2005.

BACKGROUND OF THE INVENTION

1. Field of the Invention

The present invention relates to a seal assembly for providing a fluid tight seal between a pipe and an opening in the wall of a structure, such as an underground structure in an underground pipeline system.

2. Description of the Related Art

Seal assemblies are used to provide fluid tight seals between pipes and structures in underground pipeline systems, such as septic tanks and fluid distribution boxes in sewer systems, for example. The structures are commonly made of cast concrete, rigid plastic, fiberglass, or metal, for example, and include a plurality of walls having one or more openings through which pipes extend. The seal assemblies are used to provide fluid tight seals between the wall openings and the outer surfaces of the pipes.

Concrete structures are typically formed with relatively thick walls, and gaskets used with concrete structures include cast-in gaskets and expansion-type gaskets which are made entirely of a resilient material such as rubber. Cast-in gaskets include an annular body having an outwardly-projecting anchor component or flange which is cast within the concrete of the wall such that, when the concrete cures, the flange is embedded within the cured concrete to firmly anchor the gasket within the wall opening. Cast-in gaskets also include either an inwardly-projecting sealing projection or lobe for providing a compressive seal with the outer surface of a pipe, or a resilient boot portion which is sealingly clamped to the outer surface of the pipe with a take-down clamp. Expansion-type gaskets include an annular body which, after being placed within the opening in the structure wall, is radially compressed by an expansion ring assembly to compressively seal the gasket against the wall opening. Thereafter, a take-down clamp is used to sealingly clamp a boot portion of the gasket against the outer surface of a pipe.

Although cast-in and expansion-type gaskets are effective for concrete or other structures having relatively thick walls, these types of gaskets can be less effective or, in some circumstances cannot be used at all, with structures having relatively thin walls which are made of a rigid plastic, fiberglass, or a metal, for example. In particular, the foregoing materials do not easily accommodate cast-in gaskets, and the relatively thin walls of such structures do not provide a sufficiently wide opening surface to which a gasket can be radially compressed using an expansion ring assembly.

One known seal assembly includes an elastomeric body with a rigid, threaded flange, and a nut threadable onto the threads of the flange to compress a portion of the elastomeric body into engagement with an internal wall of a structure about an opening in the structure. Thereafter, after a pipe is extended through the elastomeric body, an external take-down clamp is used to clamp a portion of the elastomeric body around the external surface of the pipe to provide a seal between the gasket body and the pipe.

A disadvantage of the foregoing seal assembly is that same requires the use of an external take-down clamp to provide a seal between the gasket body and a pipe, necessitating additional parts and increasing the number of installation steps. Also, because nearly all of the body of the seal is made of elastomeric material, which tends to be more expensive than other materials, the cost of the seal assembly is relatively high.

Another known seal assembly which is designed for use with relatively thin-walled structures includes a generally cylindrical body made entirely of plastic and including external threads, an annular flange spaced from the threads and projecting radially from the body, and an internal wall which includes a plurality of tear-out portions which may be selectively removed to provide openings of different sizes through the internal wall of the body. In use, the cylindrical body is inserted through an opening in a structure, and a separate annular nut is threaded onto the external threads of the body to capture the wall of the structure between the nut and the annular flange, and the flange is deflected to engage with and seal the side of the wall opposite the nut. Thereafter, one of a plurality of tear-out portions of the internal plastic wall is removed, and a pipe is inserted through the resulting opening in the internal wall, with the plastic wall opening slidably engaging the outer surface of the pipe to provide a deflection or wiper-type seal.

A disadvantage with the foregoing seal assembly is that the deflection or wiper-type seals between the plastic annular flange of the seal body and the wall surface, and between the opening in the internal plastic wall of the body and the outer surface of the pipe, are typically not very robust and may be prone to failure, particularly under fluid pressure. Also, failure of the plastic tear-out portions upon their removal could compromise the integrity of the seal between the seal body and the pipe, particularly when the seal assembly is used with small diameter pipes.

What is needed is a seal assembly for providing a fluid tight seal between a pipe and an opening in a structure, particularly a thin-walled structure made of a rigid plastic or of metal, which is an improvement over the foregoing.

SUMMARY OF THE INVENTION

The present invention provides a seal assembly for effecting a fluid tight seal between a pipe and an opening in the wall of a structure, particularly a relatively thin-walled structure made of a rigid plastic, fiberglass, or of metal, for example. The seal assembly generally includes a seal ring and an annular nut. The seal ring includes a relatively rigid fastener component having external threads, and a relatively resilient sealing component joined to the fastener component and including a first sealing projection for providing a compressive seal between the seal ring and one side of the structure wall, and a second annular sealing projection for providing a compressive seal between the seal ring and the outer surface of a pipe inserted through the seal ring. The seal ring is inserted through the opening in the structure, and the annular nut is threaded onto the external threads of the fastener component and into engagement with a first side of the wall to thereby compress the first sealing projection against the opposite, second side of the wall. Thereafter, a pipe is inserted through the seal ring to compress the second sealing projection between the outer surface of the pipe and the seal ring.

In particular, the fastener component of the seal ring is made of a relatively rigid plastic material, and the sealing component is made of a relatively resilient, elastomeric material which is joined or bonded to the fastener component via a co-molding process, such as a "two-shot" injection molding process. Advantageously, the fastener component and the sealing component are rigidly and mechanically joined to one another. The fastener component includes a body having external threads on a first end thereof, and a radially-projecting flange on a second end thereof from which the first sealing projection of the sealing component projects in an axial direction. The second sealing projection projects radially inwardly from the body of the fastener component.

When the seal ring is inserted through an opening in a structure wall, the external threads of the fastener component are exposed on a first side of the structure wall, and the first sealing projection is placed into direct abutment with a second, opposite side of the wall. Thereafter, the annular nut is threaded onto the external threads of the fastener component and into engagement with the first side of the wall, and continued threading of the nut onto the fastener component compresses the first sealing projection against the second side of the wall to provide a robust, compressive, fluid tight seal between the seal ring and the second side of the structure wall. Thereafter, a pipe is inserted through the seal ring to compress the second sealing projection radially between the outer surface of the pipe and the body of the fastener component to provide another robust, compressive, "stab-joint" type fluid tight seal between the seal ring and the pipe.

In one embodiment, the elastomeric portion of the seal ring may include a wall portion extending across the seal ring. The wall portion closes the seal ring to enclose the opening in the structure in applications where the structure may include several openings that are not all used to connect to pipes. In use, when a pipe is to be connected to the structure via the seal assembly, the wall portion is removed by cutting, for example, to provide an opening in the seal ring. Thereafter, the pipe is inserted through the seal ring to compress the second sealing projection radially between the outer surface of the pipe and the body of the fastener component to provide another robust, compressive, "stab-joint" type fluid tight seal between the seal ring and the pipe.

Advantageously, the compressive, "stab-joint" type fluid tight seal between the seal ring and the pipe provides a robust, fluid-tight seal without requiring the use of additional components and installation steps, such those that would be necessary if an external take-down clamp were required, for example. Also, the radially outward compression of the relatively thick, elastomeric second sealing projection of the seal ring upon insertion of the pipe provides a fluid tight seal which is more durable and robust than the wiper-type seals provided by known gasket assemblies which are based upon outward deflection of an annular plastic flange upon insertion of a pipe therethrough.

In one form thereof, the present invention provides a seal assembly defining perpendicular axial and radial directions, including a seal ring, including a rigid fastener component including a threaded annular body; a first resilient annular sealing projection projecting from the body in substantially the axial direction; and a second resilient annular sealing projection projecting inwardly from the body substantially in the radial direction; and a nut having threads threadable on the threads of the seal ring body.

In another form thereof, the present invention provides a seal assembly defining perpendicular axial and radial directions, including a seal ring, including a rigid annular fastener component including first threads; a pair of resiliently compressible sealing projections, including a first, axially facing sealing projection and a second, radially inwardly facing sealing projection, the first and second sealing projections disposed adjacent one another; and a nut having second threads threadable on the first threads of the fastener component.

In another form thereof, the present invention provides a structure, including a wall having first and second sides and an opening therein; and a seal assembly, including a rigid seal ring inserted through the opening, including threads disposed on the first side of the wall; a first resilient sealing projection disposed adjacent and facing the second side of the wall; and a second resilient sealing projection projecting radially inwardly from the seal ring; and a threaded nut threaded onto the threads of the seal ring and into contact with the first side of the wall to thereby compress the first sealing projection against the second side of the wall.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG, 6 is a perspective view of a seal assembly including a wall portion extending across the seal ring; and FIG. 7 is a sectional view of the seal assembly of FIG. 6.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 1:
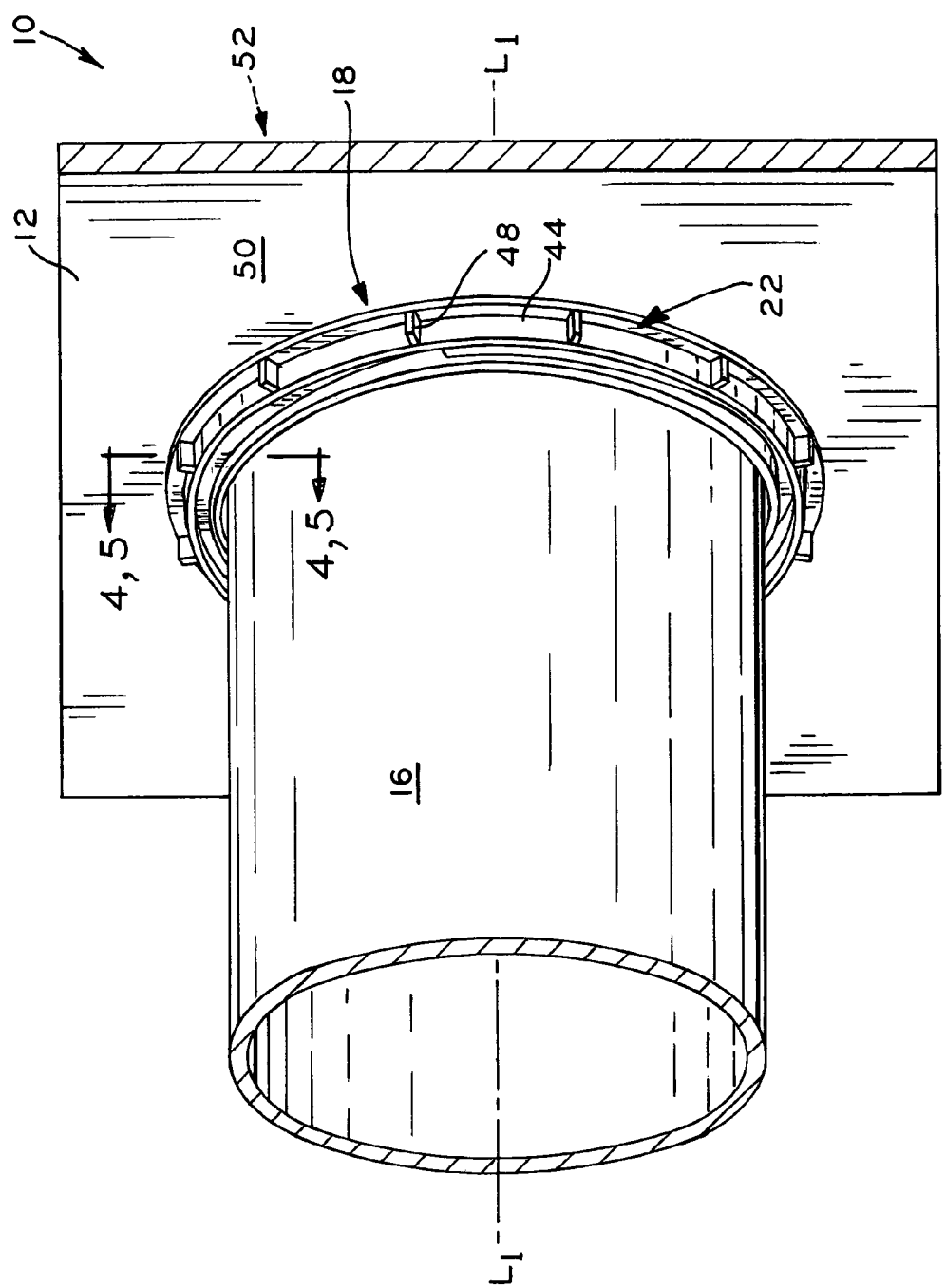
FIG. 1 is a perspective view of a portion of a structure, showing a fluid tight connection between a pipe and an opening in a wall of the structure via a seal assembly in accordance with the present invention.

Referring to FIG. 1, a portion of an underground structure 10, such as a septic tank or a fluid distribution box, for example, is shown. Structure 10 includes wall 12 having a circular opening 14 (FIGS. 2 and 3) through which a pipe 16 is inserted. Structure 10 may be formed of a rigid plastic material, or of a metal, fiberglass, concrete, or other materials. Walls 12 of structure may be relatively thin, such that known cast-in and expansion-type gaskets may not be used to provide fluid tight seals between pipe 16 and openings 14 in walls 12. As described in further detail below, a seal assembly 18 according to the present invention is used to provide a fluid tight seal between opening 14 in wall 12 and pipe 16.

Figure 2:
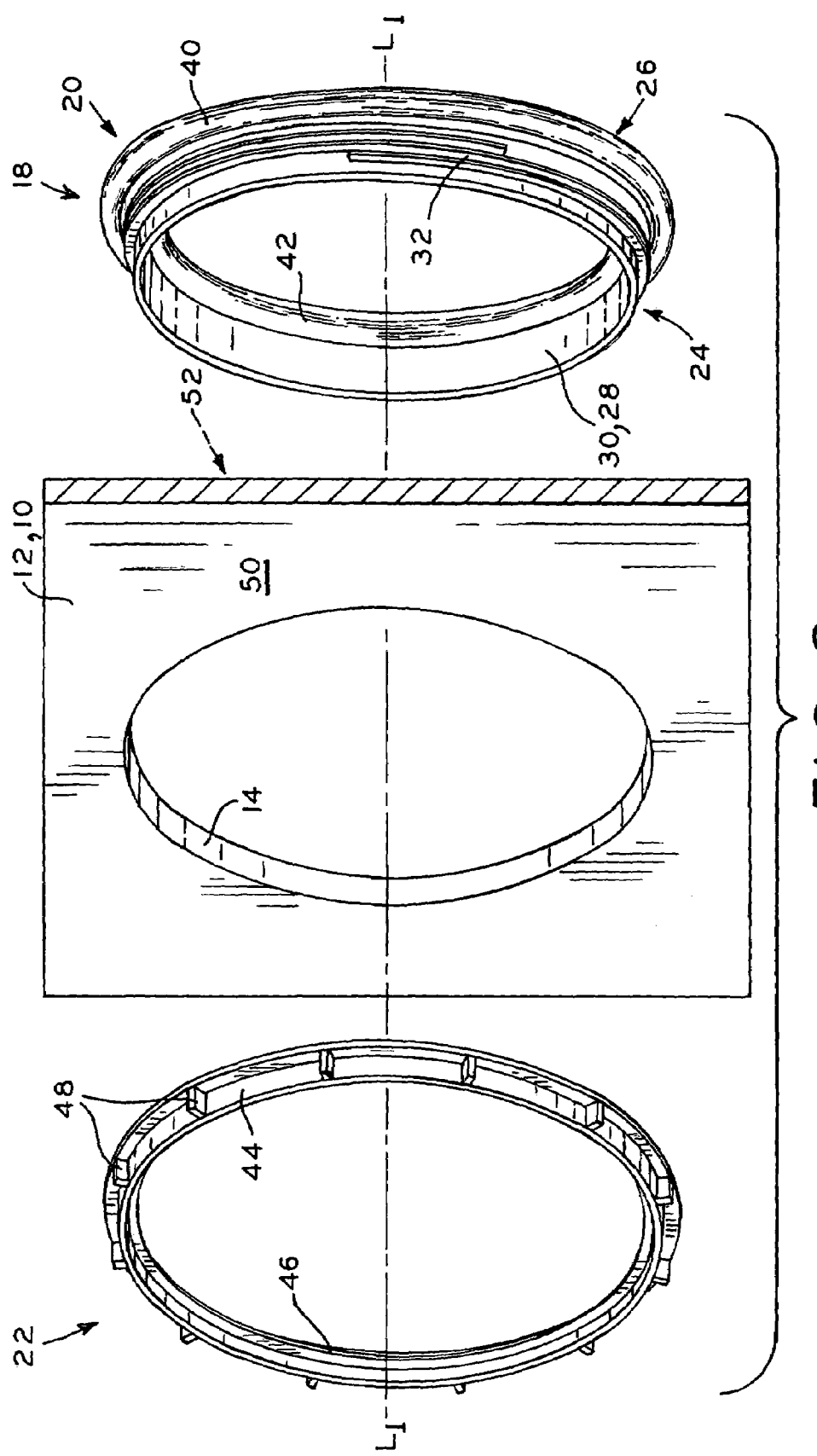
FIG. 2 is a first exploded view of the seal assembly of FIG. 1, showing the seal ring and nut on opposite sides of the structure wall.
Figure 3:
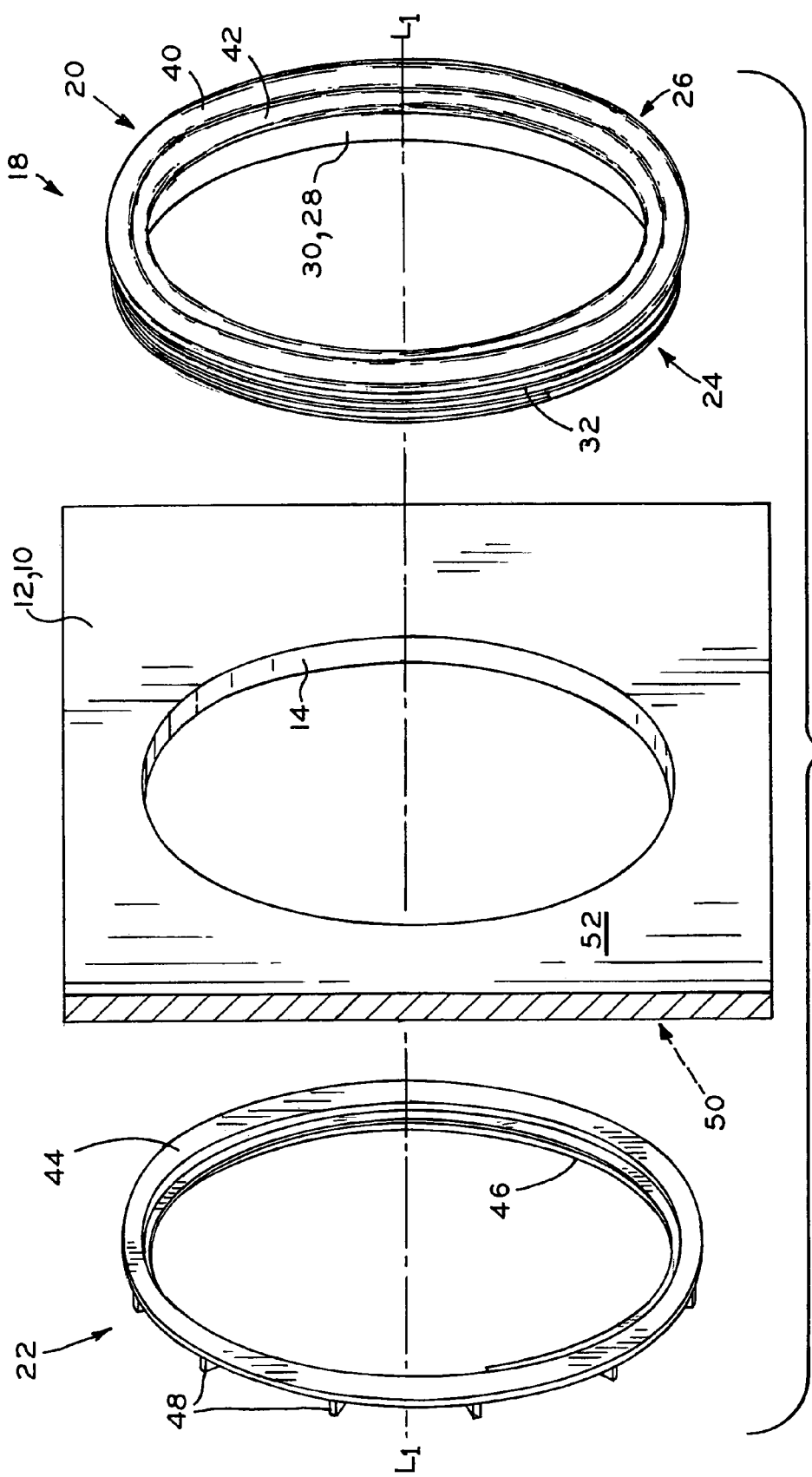
FIG. 3 is a second exploded view of the seal assembly of FIG. 1, showing the seal ring and nut on opposite sides of the structure wall.
Figure 4:
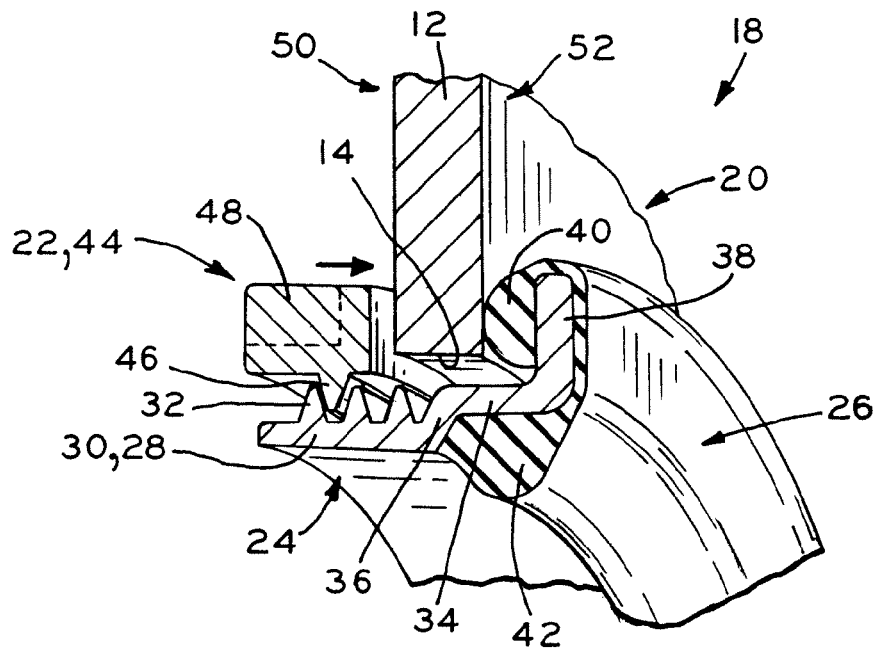
FIG. 4 is a first sectional view, taken along line 4-4 of FIG. 1, showing the seal ring inserted within the opening in the wall, and the nut being threaded onto the seal ring.

Referring to FIGS. 2-4, seal assembly 18 generally includes seal ring 20 and nut 22. Seal ring 20 generally includes fastener component 24 and sealing component 26. Fastener component 24 is made of a relatively rigid plastic material, such as polypropylene or low density polyethylene, and sealing component 26 is formed of a relatively flexible material, such as rubber or an elastomeric material such as Santoprene™, available from Advanced Elastomer Systems, LP, an ExxonMobil Chemical Affiliate. (Santoprene™ is a trademark of Advanced Elastomer Systems, LP).

Fastener component 24 and sealing component 26 may advantageously be formed according to a "two-shot" molding process wherein, for example, fastener component 24 is molded first and, before the material of fastener component 24 fully cures, sealing component 26 is molded to fastener component 24 such that, upon curing of the materials, a firm bond is created therebetween to join fastener component 24 and sealing component 26 to one another. "Two-shot" molding processes are generally known, and further details of an exemplary "two-shot" molding process are discussed in U.S. patent application Ser. No. 11/220,229, entitled PIPE JOINT GASKET, assigned to the assignee of the present invention, the disclosure of same is expressly incorporated herein by reference.

Fastener component 24 includes an annular body 28 defining an axial direction, which is parallel to the central, longitudinal axis $L_1$-$L_1$ (FIGS. 1-3) of seal ring 20 and opening 14, and a perpendicular radial direction. Body 28 generally includes first portion 30 aligned in the axial direction and having external threads 32. Second portion 34 is also aligned in the axial direction and is joined to first portion 30 via an angled portion 36, such that second portion 34 is stepped slightly radially outwardly from first portion 30. Third portion 38 of body 28 projects in the radial direction from the end of second portion 34 which is opposite first portion 30.

Sealing component 26 includes an annular first lobe or sealing projection 40 joined to and projecting in the axial direction from third portion 38 of body 28 of fastener component 24. Sealing component 26 also includes an annular second lobe or sealing projection 42 joined to and projecting inwardly in the radial direction from second portion of body 28 of fastener component 24. As may be seen from FIGS. 4 and 5, first and second sealing projections 40 and 42 are disposed adjacent one another, wherein, when seal ring 20 is inserted through opening 14 in wall 12 of a structure, first sealing projection 40 is substantially radially aligned with opening 14 of wall 12.

Referring to FIGS. 1-4, nut 22 is formed as an annular member made of a suitable rigid plastic or a metal, for example, and generally includes annular body 44 having internal threads 46, and a plurality of gripping ridges 48 radially spaced around body 44 for allowing nut 22 to be grasped for rotation by the installer either manually or with a suitable tool, as described below.

In use, to provide a fluid tight seal between opening 14 in wall 12 of structure 10 and pipe 16, referring to FIGS. 2-4, seal ring 20 is first inserted through opening 14 in wall 12 such that first portion 30 of body 28 of fastener component 24 and external threads 32 are exposed on a first side 50 of wall 12, and first sealing projection 40 is in direct abutment with an opposite second side 52 of wall 12. In typical installations, and as described below, sealing ring 20 is inserted through opening 14 in wall 12 from the interior of structure 10, and nut 22 is threaded onto fastener component 24 of sealing ring 20 from externally of structure 10. However, the foregoing may be reversed, wherein sealing ring 20 may be inserted through opening 14 in wall 12 from externally of structure 10, and nut 22 may be threaded onto fastener component 24 of sealing ring 20 from internally of structure 10. Additionally, although seal ring 20 includes external threads and nut 22 includes internal threads, with some modifications to seal ring 20 and nut 22 the foregoing configuration may be reversed, such that seal ring 20 would include internal threads and nut 22 would include external threads.

Figure 5:
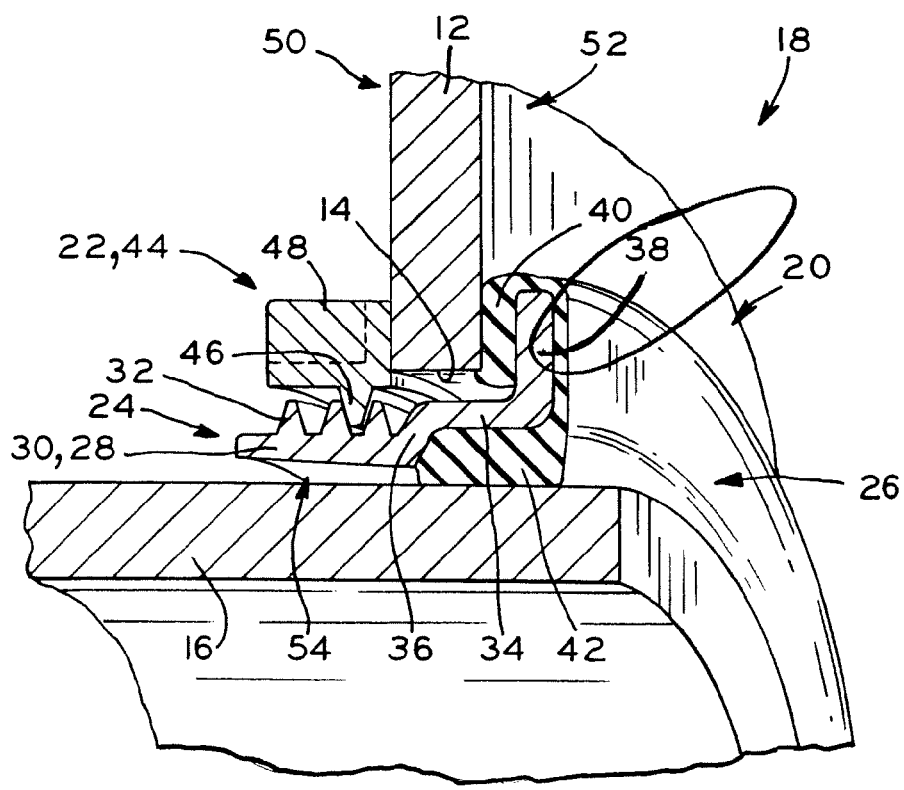
FIG. 5 is a second sectional view, taken along line 5-5 of FIG. 1, showing the nut fully threaded onto the seal ring to provide a fluid tight compressive seal between the seal ring and the wall, and further showing a pipe inserted through the seal ring to provide a fluid tight compressive seal between the seal ring and the pipe.

After seal ring 20 is inserted through opening 14 in wall 12 as described above, an installer grasps nut 22, either manually or with a suitable tool, to rotate and thread nut 22 onto external threads 32 of fastener component 24 as shown in FIG. 4, until body 44 of nut 22 engages first side 50 of wall 12. Thereafter, continued rotation of nut 22 and threading of nut 22 onto external threads of fastener component 24 further translates nut 22 along fastener component 24, as shown in FIG. 5, to thereby axially compress first sealing projection 40 between second side 52 of wall 12 and third portion 38 of body 28 of fastener component 24 to provide a robust, compressive, fluid tight seal between sealing ring 20 and second side 52 of wall 12. Thereafter, referring to FIG. 5, pipe 16 is then inserted through sealing ring 20, such that second sealing projection 42 of seal ring 20 is raidially outwardly compressed between the outer surface of pipe 16 and fastener component 24 to provide another robust, compressive, or "stab-joint" type fluid tight seal provided between seal ring 20 and pipe 16 provides a robust, fluid-tight seal without requiring the use of additional components and installation steps, such those that would be necessary if an external take-down clamp were required, for example. Also, the radially outward compression of the relatively thick, elastomeric second sealing projection 42 of seal ring 20 upon insertion of pipe 16 provides a fluid tight seal which is more durable and robust than the wiper-type seals provided by known gasket assemblies.

After pipe 16 is inserted through seal ring 20 as shown in FIG. 5, an annular gap 54 is defined between the outer surface of pipe 16 and body 28 of fastener component 24 of seal ring 20. Advantageously, annular gap 54 accommodates angular the deflection of pipe 16 in directions away from its central longitudinal axis, such as when soil shifting occurs around pipe 16 and structure 10 in an underground application, for example, with second sealing projection 42 of seal ring 20 remaining radially compressed between the outer surface of pipe 16 and seal ring 20 to maintain the watertight seal therebetween.

Referring to FIGS. 6 and 7, seal ring 20 may include wall portion 60 which, in one embodiment, may be formed of an elastomeric material monolithically or integrally with second sealing projection 42 of sealing component 26 of seal ring 20, for example. Wall portion 60 may be connected around its outer periphery to second sealing projection 42, or another portion of sealing component 26, by an annular thin section or web 62 of elastomeric material which defines a located at which wall portion 60 may be removed, such as by cutting around the entire extent of web 62 or by cutting a portion of web 62 followed by tearing web 62 around the remainder of the circumference thereof, for example, to separate wall portion 60 from the remainder of sealing component 26. Wall portion 60 extends across seal ring 20 and closes same, to in turn fluid-tightly close the opening 14 in structure 10 when seal ring 20 is installed in opening 14 as discussed above. In some applications, structure 10 may include several openings 14, only some of which are used with pipe connections. In particular, in some uses of structures such as structure 10, the locations of the pipes is not known or determined until the installation of structure is begun at a work site. In one embodiment, each opening 14 of structure 10 may be fitted with a seal assembly 18 having wall portion 60 to provide fluid tight closures of the respective openings 14. When a pipe is to be installed through a particular seal assembly 18, wall portion 60 is removed, such as by cutting same away from second sealing projection 42, and a pipe is sealingly connected to seal ring 20 as discussed above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly defining perpendicular axial and radial directions, comprising:
    a seal ring, comprising:
        a rigid fastener component including a threaded annular body;
        a first resilient annular sealing projection projecting from said body in substantially the axial direction;
        a second resilient annular sealing projection projecting inwardly from said body substantially in the radial direction; and
        a wall portion extending across said seal ring; and
    a nut having threads threadable on said threads of said seal ring body.

2. The seal assembly of claim 1, wherein said wall portion is formed of a resilient material and is integrally formed with said second annular sealing projection.

3. The seal assembly of claim 1, wherein said first and second sealing projections are co-molded with said fastener component body.

4. The seal assembly of claim 1, wherein said first and second sealing projections are integrally formed with one another.

5. A seal assembly defining perpendicular axial and radial directions, comprising:
    a seal ring, comprising:
        a rigid annular fastener component including first threads;
        a pair of resiliently compressible sealing projections, including a first, axially facing sealing projection and a second, radially inwardly facing sealing projection, said first and second sealing projections disposed adjacent one another; and
        a wall portion extending across said seal ring; and
    a nut having second threads threadable on said first threads of said fastener component.

6. The seal assembly of claim 5, wherein said wall portion is formed of a resilient material and is integrally formed with said second sealing projection.

7. The seal assembly of claim 5, wherein said first and second sealing projections are each co-molded with said fastener component.

8. The seal assembly of claim 5, wherein said first and second sealing projections are integrally formed with one another.

9. A structure, comprising:
    a wall having first and second sides and an opening therein; and
    a seal assembly, comprising:
        a rigid seal ring inserted through said opening, including threads disposed on said first side of said wall;
        a first resilient sealing projection disposed adjacent and facing said second side of said wall; and
        a second resilient sealing projection projecting radially inwardly from said seal ring, said first and second sealing projections disposed substantially within a common plane parallel to said wall, said second sealing projection compressible radially outwardly against said seal ring; and
        a threaded nut threaded onto said threads of said seal ring and into contact with said first side of said wall to thereby compress said first sealing projection against said second side of said wall.

10. The structure of claim 9, further comprising a pipe inserted through said seal ring, said second sealing projection compressed between an outer surface of said pipe and said seal ring.

11. The structure of claim 9, wherein said first and second sealing projections are each bonded to said seal ring via a co-molding process.

12. The structure of claim 9, wherein said first and second sealing projections are integrally formed with one another.

13. The structure of claim 9, wherein said seal assembly defines perpendicular axial and radial directions, and further comprises:
    a first portion extending in the axial direction to which said second sealing projection is joined; and
    a second portion extending in the radial direction to which said first sealing projection is joined.

14. The structure of claim 9, wherein said seal ring includes a first portion and a second portion, said first portion including said threads, and said second portion axially spaced from said first portion, said first and second sealing projections each projecting from said second portion.

15. A structure, comprising:
    a wall having first and second sides and an opening therein; and
    a seal assembly, comprising:
        a rigid seal ring inserted through said opening, including threads disposed on said first side of said wall;
        a first resilient sealing projection disposed adjacent and facing said second side of said wall; and
        a second resilient sealing projection projecting radially inwardly from said seal ring; and
        a wall portion extending across said seal ring, said wall portion closing said opening; and
        a threaded nut threaded onto said threads of said seal ring and into contact with said first side of said wall to thereby compress said first sealing projection against said second side of said wall.

16. The structure of claim 15, wherein said wall portion is formed of a resilient material and is integrally formed with said second sealing projection of said seal ring.

17. The structure of claim 15, wherein said first and second sealing projections are each bonded to said seal ring via a co-molding process.

18. The structure of claim 15, wherein said first and second sealing projections are integrally formed with one another.

* * * * *